(12) United States Patent
Meincke, II

(10) Patent No.: US 11,318,626 B1
(45) Date of Patent: May 3, 2022

(54) COMPLIANT JOINT FOR A ROBOTIC ARM

(71) Applicant: John W. Meincke, II, Medfield, MA (US)

(72) Inventor: John W. Meincke, II, Medfield, MA (US)

(73) Assignee: Empower Robotics Corporation, Lexington, MA (US)

( * ) Notice: Subject to any disclaimer, the term of this patent is extended or adjusted under 35 U.S.C. 154(b) by 67 days.

(21) Appl. No.: 16/292,262

(22) Filed: Mar. 4, 2019

Related U.S. Application Data

(60) Provisional application No. 62/637,909, filed on Mar. 2, 2018.

(51) Int. Cl.
*B25J 17/02* (2006.01)
*B25J 9/00* (2006.01)
*B25J 17/00* (2006.01)

(52) U.S. Cl.
CPC ......... *B25J 17/0208* (2013.01); *B25J 9/0006* (2013.01); *B25J 17/00* (2013.01); *B25J 17/0233* (2013.01); *B25J 17/0283* (2013.01)

(58) Field of Classification Search
CPC .. B25J 17/0233; B25J 17/0283; B25J 19/068; B25J 17/00; B25J 17/025; B25J 17/0241; B25J 17/0208; B25J 19/0091; B25J 9/0006; B25J 9/0084; B25J 17/02; B25J 17/0225; B25J 17/0216; B25J 19/0016; B25J 9/1641; B25J 9/1075; B25J 17/0266; B25J 9/06; B25J 17/0291; B25J 18/00; F13M 13/00
USPC ...................................................... 74/490.05
See application file for complete search history.

(56) References Cited

U.S. PATENT DOCUMENTS

| 1,707,530 | A | * | 4/1929 | Meseroll | ................... | F16D 3/48 464/65.1 |
| 3,747,368 | A | * | 7/1973 | Morin | ....................... | F16D 3/30 464/109 |
| 3,824,674 | A | * | 7/1974 | Inoyama | ............... | B23P 19/105 29/407.05 |
| 4,458,424 | A | * | 7/1984 | Cutkosky | .............. | B23P 19/105 33/644 |

(Continued)

FOREIGN PATENT DOCUMENTS

FR 3066422 A1 * 11/2018 .......... B25J 15/0061

*Primary Examiner* — Muhammad Ijaz
*Assistant Examiner* — Taylor L Morris
(74) *Attorney, Agent, or Firm* — Spano Law Group; Joseph S. Spano

(57) ABSTRACT

Mechanisms to realize lightweight rotational joints having independently adjustable compliance in one or more degrees of freedom are presented herein. In addition, robotic systems incorporating one or more compliant rotational joints as described herein are also presented. In some embodiments, a robotic structure includes a member having adjustable rotational compliance. One or more compliance elements are arranged around a rotational joint. The position of the one or more compliance elements relative to the rotational joint is adjusted to change the overall joint compliance. In some embodiments, the change of position of the one or more compliance elements relative to the rotational joint changes both the induced displacement of the compliance element for a given angular displacement of the rotational joint and the length of the moment arm from the rotational joint to the compliance element.

19 Claims, 11 Drawing Sheets

(56) References Cited

U.S. PATENT DOCUMENTS

| | | | | |
|---|---|---|---|---|
| 4,499,784 A * | 2/1985 | Shum | B25J 17/0291 | 74/490.06 |
| 4,571,148 A * | 2/1986 | Drazan | B23P 19/105 | 29/714 |
| 4,621,965 A * | 11/1986 | Wilcock | B25J 18/06 | 414/7 |
| 4,627,169 A * | 12/1986 | Zafred | B23Q 1/36 | 33/520 |
| 4,689,538 A * | 8/1987 | Sakaguchi | B25J 9/046 | 318/568.21 |
| 4,776,852 A * | 10/1988 | Bubic | A61F 2/68 | 623/26 |
| 4,784,042 A * | 11/1988 | Paynter | B25J 9/142 | 414/7 |
| 4,896,431 A * | 1/1990 | Danmoto | B23P 19/102 | 33/520 |
| 4,954,005 A * | 9/1990 | Knasel | B25J 19/063 | 403/116 |
| 4,990,050 A * | 2/1991 | Tsuge | B23Q 1/54 | 414/735 |
| 5,271,686 A * | 12/1993 | Herring, Jr. | B21J 15/10 | 403/229 |
| 5,396,714 A * | 3/1995 | Sturges, Jr. | B23Q 1/34 | 33/520 |
| 5,421,696 A * | 6/1995 | Stephan | B25J 17/0208 | 29/740 |
| 5,556,370 A * | 9/1996 | Maynard | A61B 1/0058 | 600/142 |
| 5,740,699 A * | 4/1998 | Ballantyne | B25J 17/0266 | 403/120 |
| 5,836,083 A * | 11/1998 | Sangwan | B23P 19/102 | 33/644 |
| 5,870,842 A * | 2/1999 | Ogden | G09F 19/08 | 40/411 |
| 6,408,531 B1 * | 6/2002 | Schimmels | B23P 19/102 | 29/428 |
| 6,473,985 B2 * | 11/2002 | Won | B23P 19/102 | 33/520 |
| 7,154,362 B2 * | 12/2006 | Ohnstein | B08B 9/045 | 335/229 |
| 7,421,799 B2 * | 9/2008 | Joo | B25J 17/0208 | 33/520 |
| 7,497,781 B2 * | 3/2009 | Cunningham | F16F 15/10 | 464/86 |
| 7,555,969 B2 * | 7/2009 | Okazaki | B25J 9/1075 | 74/490.05 |
| 7,798,036 B2 * | 9/2010 | Okazaki | B25J 9/142 | 74/490.05 |
| 7,892,154 B1 * | 2/2011 | Alexa | A63B 21/00069 | 482/112 |
| 8,201,473 B2 * | 6/2012 | Knoll | A61B 1/00156 | 74/490.05 |
| 8,562,448 B2 * | 10/2013 | Song | B25J 17/0208 | 464/104 |
| 8,661,929 B2 * | 3/2014 | Choi | B25J 17/00 | 74/490.05 |
| 8,714,903 B2 * | 5/2014 | Feng | B25J 9/0051 | 414/735 |
| 8,794,098 B2 * | 8/2014 | Long | B25J 17/0216 | 74/490.05 |
| 8,887,595 B2 * | 11/2014 | Williams | A61B 34/30 | 74/490.01 |
| 9,138,897 B1 * | 9/2015 | Salisbury | B25J 19/0091 | |
| 9,239,100 B1 * | 1/2016 | Weber | B25J 9/046 | |
| 9,409,292 B2 * | 8/2016 | Smith | B25J 5/005 | |
| 9,550,299 B2 * | 1/2017 | Wolf | B25J 17/0275 | |
| 9,709,119 B2 * | 7/2017 | Kendrick | B25J 11/00 | |
| 10,098,778 B1 * | 10/2018 | Asada | A61F 5/028 | |
| 10,251,717 B2 * | 4/2019 | Devengenzo | A61B 34/37 | |
| 10,315,309 B2 * | 6/2019 | Radin | B25J 9/06 | |
| 10,562,180 B2 * | 2/2020 | Telleria | B25J 18/06 | |
| 10,729,610 B2 * | 8/2020 | Matthew | A61H 1/00 | |
| 2011/0070019 A1 * | 3/2011 | Song | B25J 17/0275 | 403/26 |
| 2011/0126660 A1 * | 6/2011 | Lauzier | B25J 17/0266 | 74/490.05 |
| 2011/0313331 A1 * | 12/2011 | Dehez | A61H 1/0277 | 601/33 |
| 2012/0128406 A1 * | 5/2012 | Pioro | G01C 3/02 | 403/113 |
| 2013/0118287 A1 * | 5/2013 | Holgate | B25J 17/0216 | 74/490.01 |
| 2015/0047452 A1 * | 2/2015 | Wolf | B25J 17/00 | 74/490.05 |
| 2015/0114163 A1 * | 4/2015 | Rosheim | B25J 17/00 | 74/490.03 |
| 2015/0122073 A1 * | 5/2015 | Maisonnier | B25J 9/0006 | 74/490.05 |
| 2016/0031076 A1 * | 2/2016 | Garrett | A61H 1/024 | 248/550 |
| 2016/0114479 A1 * | 4/2016 | Rosheim | B25J 9/06 | 74/490.03 |
| 2016/0151920 A1 * | 6/2016 | Nakata | B25J 18/00 | 74/490.06 |
| 2017/0045106 A1 * | 2/2017 | Kendrick | F16F 13/007 | |
| 2017/0144309 A1 * | 5/2017 | Sankai | B25J 17/00 | |
| 2017/0209330 A1 * | 7/2017 | Hughes | B25J 17/00 | |
| 2017/0259427 A1 * | 9/2017 | Asada | B25J 9/0006 | |
| 2017/0292562 A1 * | 10/2017 | Kim | B25J 9/0015 | |
| 2018/0370021 A1 * | 12/2018 | Asada | B25J 13/02 | |
| 2019/0077029 A1 * | 3/2019 | Mankau | B25J 9/142 | |
| 2019/0091857 A1 * | 3/2019 | Ben-Tzvi | B25J 9/1664 | |
| 2019/0234499 A1 * | 8/2019 | Krishna | F16H 25/2056 | |
| 2020/0094421 A1 * | 3/2020 | Morimura | B25J 17/00 | |
| 2020/0170809 A1 * | 6/2020 | Etenzi | A61F 2/66 | |
| 2020/0376686 A1 * | 12/2020 | Riedel | B25J 19/0075 | |

\* cited by examiner

COMPLIANT JOINT FOR A ROBOTIC ARM

CROSS REFERENCE TO RELATED APPLICATIONS

The present application for patent claims priority under 35 U.S.C. § 119 from U.S. provisional patent application Ser. No. 62/637,909, entitled "Compliant Joint For A Robotic Arm," filed Mar. 2, 2018, the subject matter of which is incorporated herein by reference in its entirety.

TECHNICAL FIELD

The described embodiments relate to systems and methods for transmitting moments through a mechanical structure including a compliant joint to achieve a range of mechanical compliance in a compact envelope.

BACKGROUND INFORMATION

In many applications, compliant mechanical joints are employed to transmit forces and moments through a mechanical structure. However, transmission of forces and moments with relatively low compliance (high stiffness) over a relatively large range of motion with relatively low overall weight and adjustable compliance (stiffness) can be challenging. Improvements in the design of systems including variable compliance mechanical joints are desired.

SUMMARY

Lightweight rotational joints having independently adjustable compliance in one or more degrees of freedom are presented herein.

In some embodiments, a robotic structure includes a member having adjustable rotational compliance. One or more compliance elements are arranged around a rotational joint. The position of the one or more compliance elements relative to the rotational joint is adjusted to change the overall joint compliance. In some embodiments, the change of position of the one or more compliance elements relative to the rotational joint changes both the induced displacement of the compliance element for a given angular displacement of the rotational joint and the length of the moment arm from the rotational joint to the compliance element.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Mechanisms to realize lightweight rotational joints having independently adjustable compliance in one or more degrees of freedom are presented herein. In addition, robotic systems incorporating one or more compliant rotational joints as described herein are also presented.

In some embodiments, a robotic structure includes a member having adjustable rotational compliance. One or more compliance elements are arranged around a rotational joint. The position of the one or more compliance elements relative to the rotational joint is adjusted to change the overall joint compliance. In some embodiments, the change of position of the one or more compliance elements relative to the rotational joint changes both the induced displacement of the compliance element for a given angular displacement of the rotational joint and the length of the moment arm from the rotational joint to the compliance element.

Figure 1:
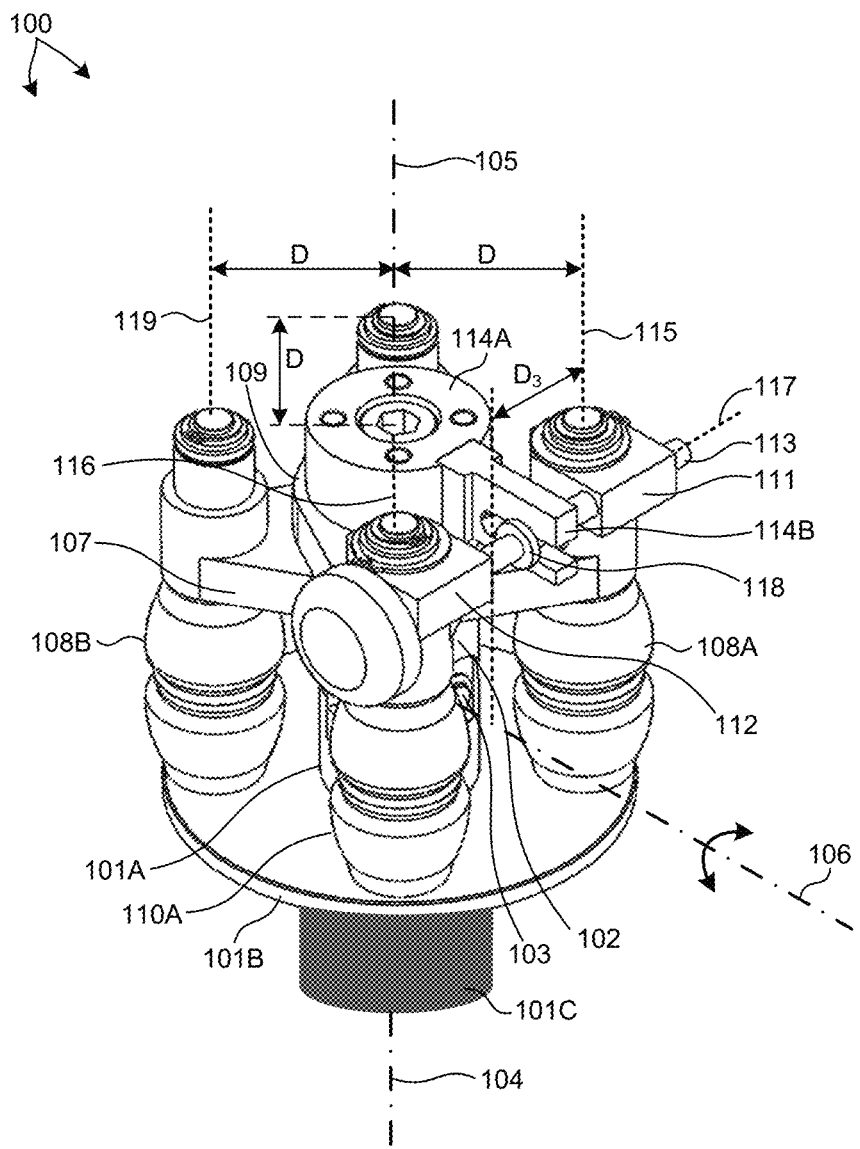
FIG. 1 is a diagram illustrative of a one degree of freedom compliant mechanical joint device 100.

FIG. 1 is a diagram illustrative of a one degree of freedom compliant mechanical joint device 100 in one embodiment. Compliant mechanical joint device 100 includes a mechanical joint structure 102 having a longitudinal axis 105 and a complementary mechanical joint structure including joint structure 101A, support plate 101B, and interface structure 101C. In the depicted embodiment mechanical joint structure 102 is cylindrically shaped and longitudinal axis 105 is coaxial with the central axis of the cylindrical structure 102. Similarly, joint structure 101A is cylindrically shaped and longitudinal axis 104 is coaxial with the central axis of joint structure 101. Mechanical joint structure 102 and joint structure 101A are mechanically coupled by a pin 103. In this manner, mechanical joint structure 102 and joint structure 101A are mechanically constrained to rotate with respect to one another only about pin 103. In the embodiment depicted in FIG. 1, pin 103 is cylindrically shaped and a compliant joint axis 106 is coaxial with the central axis of pin 103. In this manner, compliant joint axis 106 is perpendicular to both longitudinal axis 104 and longitudinal axis 105.

In addition, compliant mechanical joint device 100 includes spring connector structures 107 and 109, each mechanically coupled to mechanical joint structure 102 such that the spring connector structures 107 and 109 independently rotate with respect to mechanical joint structure 102 about longitudinal axis 105. Mechanical compliance assemblies 108A and 108B are each mechanically coupled to spring connector structure 107 at a distance, D, from longitudinal axis 105. Mechanical compliance assemblies 108A and 108B are each mechanically coupled to spring connector structure 107 in opposite directions with respect to longitudinal axis 105. Similarly, mechanical compliance assemblies 110A and 110B (not visible in FIG. 1) are each mechanically coupled to spring connector structure 109 at a distance, D, from longitudinal axis 105. Mechanical compliance assemblies 110A and 110B are each mechanically coupled to spring connector structure 109 in opposite directions with respect to longitudinal axis 105. Mechanical compliance assemblies 108A, 108B, 110A, and 110B are each in mechanical contact (e.g., sliding mechanical contact) with support plate 101B.

In the embodiment depicted in FIG. 1, a cap structure 114A is fixedly coupled to mechanical joint structure 102 by one or more fasteners (e.g., one or more socket head cap screws). Cap structure 114A constrains spring connector structures 107 and 109 to independently rotate with respect to mechanical joint structure 102 about longitudinal axis 105 with minimal clearance (e.g., one to five thousandths of an inch) in a direction aligned with longitudinal axis 105. In addition, a reference structure 114B is fixedly coupled to cap structure 114A (e.g., press fit or mechanically fastened). Thus, reference structure is fixedly coupled to mechanical joint structure 102. In some embodiments, reference structure 114B and cap structure 114A are manufactured as a single part (e.g., a single machined part or single cast part).

In the embodiment depicted in FIG. 1, a joint stiffness adjustment mechanism is coupled to spring connector structures 107 and 109. The joint stiffness adjustment mechanism rotates the spring connector structures 107 and 109 about longitudinal axis 105 in opposite directions, and thus adjusts the position of mechanical compliance assemblies 108A, 108B, 110A, and 110B with respect to compliant joint axis 106.

Mechanical compliance assemblies 108A, 108B, 110A, and 110B collectively provide a restoring moment to resist an external moment applied to compliant mechanical joint device 100 about compliant joint axis 106. A rotational movement of mechanical joint structure 102 with respect to joint structure 101A about compliant joint axis 106 (i.e., a deflection of compliant mechanical device 100) induced by an externally applied moment induces a deflection of each of mechanical compliance assemblies 108A, 108B, 110A, and 110B. Each induced deflection causes a restoring force to be generated at each respective mechanical compliance assembly. Each restoring force acts on support plate 110B and a respective spring connector structure in opposite directions. The restoring force is converted to a restoring moment by the moment arm of support plate 110B and each respective spring connector structure (i.e., the distance between the line of action of the restoring force at each mechanical compliance assembly and compliant joint axis 106). For example, a restoring force, F, generated by mechanical compliance assembly 108A, generates a corresponding restoring moment, F*D3, because the restoring force acts on support plate 110B and spring connector structure 107 in opposite directions at a distance, D3, from compliant joint axis 106.

Each mechanical compliance assembly includes one or more mechanically compliant elements. By way of non-limiting example, a mechanically compliant element of a compliant mechanical joint device as described herein may include any of a polymer spring, a metallic spring, a coiled spring, a leaf spring, or any combination thereof.

The joint stiffness adjustment mechanism of a compliant mechanical joint device as described herein includes any suitable mechanism to rotate one or more spring connector structures about a joint structure of the compliant mechanical joint device. By way of non-limiting example, a joint stiffness adjustment mechanism as described herein may include any of a linear actuator, an eccentric actuator, and a jackscrew.

In the embodiment depicted in FIG. 1, the joint stiffness adjustment mechanism includes a pivot block 111 coupled to spring connector structure 107, a pivot block 112 coupled to spring connector structure 109, and a jackscrew 117. Pivot block 111 is mechanically coupled to the spring connector structure 107 such that pivot block 111 rotates relative to spring connector structure 107 about an axis 115. Axis 115 is attached to spring connector structure 107 and is parallel with a line of action of force generated by mechanical compliance assembly 108A. Similarly, pivot block 112 is mechanically coupled to the spring connector structure 109 such that pivot block 112 rotates relative to spring connector structure 109 about an axis 116. Axis 116 is attached to spring connector structure 109 and is parallel with a line of action of force generated by mechanical compliance assembly 110A. Jackscrew 118 includes a threaded portion that threads into pivot block 111 and another threaded portion that threads into pivot block 112. Each threaded portion is threaded in the opposite direction (e.g., one portion is threaded right handed, and the other portion is threaded left handed). As a result, a rotation of jackscrew 118 about its longitudinal axis 117 causes pivot blocks 111 and 112 to move toward one another or away from one another depending on the direction of rotation of jackscrew 118. Also, as depicted in FIG. 1, jackscrew 118 includes thrust surfaces 118 in contact with reference structure 114B, which maintain the position of jackscrew 118 with respect to mechanical joint structure 102 in a direction aligned with longitudinal axis 117. In this manner, the positions of pivot blocks 111 and 112, and thus the orientations of spring connector structures 107 and 109 with respect to mechanical joint structure 102 are symmetric about compliant joint axis 106 for any adjustment of compliance induced by rotation of jackscrew 118. As depicted in FIG. 1, as jackscrew 118 is rotated, the spring connector structures 107 and 109 rotate about axis 105 in opposite directions. This induces a corresponding movement of mechanical compliance assemblies 108A, 108B, 110A, and 110B coupled to spring connector structures 107 and 109, respectively. Each of the mechanical compliance assemblies 108A, 108B, 110A, and 110B slide on support plate 101B to allow position adjustment.

Although FIG. 1 describes a compliant mechanical joint mechanism including two counter-rotating spring connector structures each coupled to two mechanical compliance assemblies mounted on opposite sides of the joint axis, in general, any suitable number of spring connector structures each coupled to any number of mechanical compliance assemblies at any suitable distance from the joint axis many contemplated within the scope of this patent document. In one example, a compliant mechanical joint mechanism includes a single spring connector structure coupled to a single mechanical compliance assembly. In another example, a compliant mechanical joint mechanism includes a single spring connector structure coupled to two mechanical compliance assemblies, each located on opposite sides of the joint axis.

The embodiment described with reference to FIG. 1 may be advantageous because its symmetric design minimizes parasitic moments applied to the rotational joint.

Figure 2:
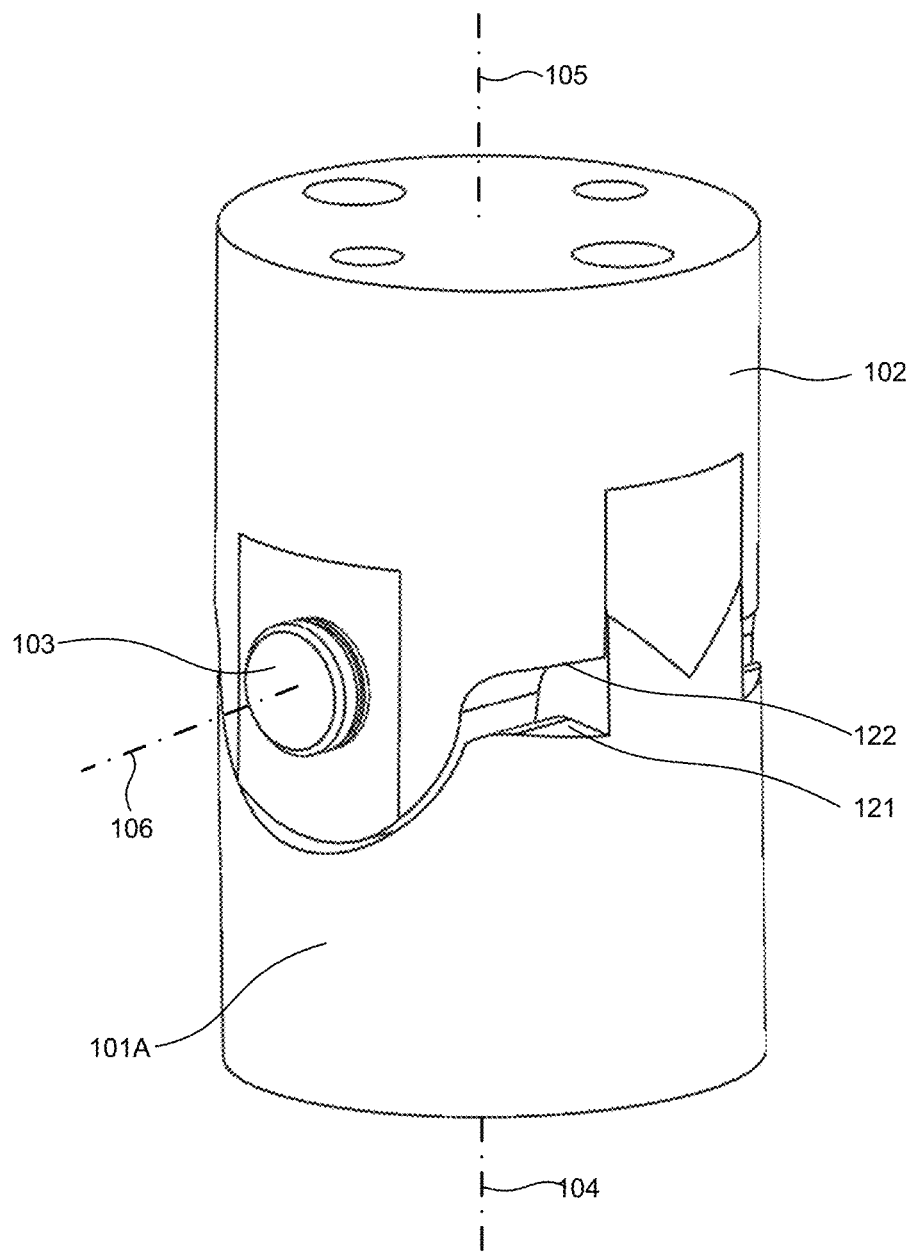
FIG. 2 is a diagram illustrative of a pin joint mechanism having integrated hard stops.

FIG. 2 is a diagram illustrative of a pin joint mechanism having integrated hard stops. As depicted in FIG. 2, mechanical joint structure 102 and joint structure 101A include complementary mechanical stop surfaces 122 and 121, respectively, which provide overtravel protection. At a maximum joint angle of the compliant mechanical joint mechanism, mechanical stop surfaces 122 and 121 come into mechanical contact and prevent the compliant mechanical joint mechanism from bending at an angle that exceeds the maximum joint angle.

Figure 3:
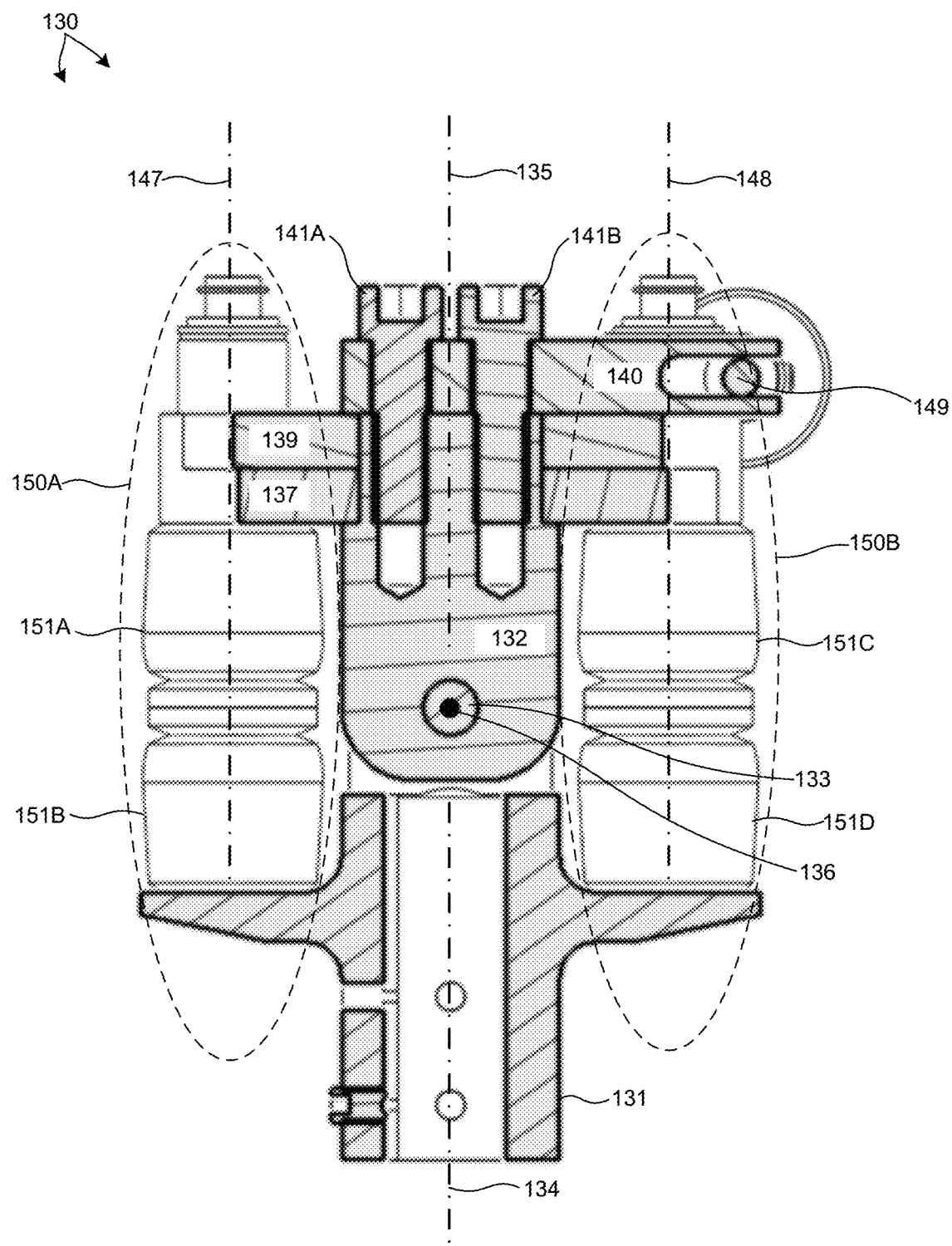
FIG. 3 is a diagram illustrative of a cross-sectional view of a one degree of freedom compliant mechanical joint device such as the compliant mechanical joint device 100 depicted in FIG. 1.

FIG. 3 is a diagram illustrative of a cross-sectional view of a one degree of freedom compliant mechanical joint device 130 such as the compliant mechanical joint device 100 depicted in FIG. 1. As depicted in FIG. 3, mechanical joint device 130 includes mechanical joint structure 132 having a longitudinal axis 135 and an integrated joint structure 131 having a longitudinal axis 134. Mechanical joint structure 132 and integrated joint structure 131 are mechanically coupled by pin 133 such that mechanical joint structure 132 and integrated joint structure 131 are mechanically constrained to rotate with respect to one another about compliant joint axis 136. Spring connector structures 137 and 139 are constrained to rotate about mechanical joint structure 132 in a direction aligned with axis 135 by integrated cap structure 140 fixedly coupled to mechanical joint structure 132 by fasteners 141A and 141B. As depicted in FIG. 3, integrated cap structure both constrains spring connector structures 137 and 139 and provides the reference structure employed to constrain the position of jackscrew 149. FIG. 3 depicts mechanical compliance assembly 150A coupled to spring connector structure 139 having a line of action aligned with axis 147 and mechanical compliance assembly 150B coupled to spring connector structure 137 having a line of action aligned with axis 148. As depicted in FIG. 3, mechanical compliance assembly 150A includes two polymer spring elements 151A and 151B disposed end to end, and mechanical compliance assembly 150B includes two polymer spring elements 151C and 151D disposed end to end. In some embodiments, polymer springs 151A-D are polymer bumpers, e.g., model GBA-3 polymer bumpers manufactured by Miner Elastomer Products Corporation, Geneva, Ill. (USA).

Figure 4:
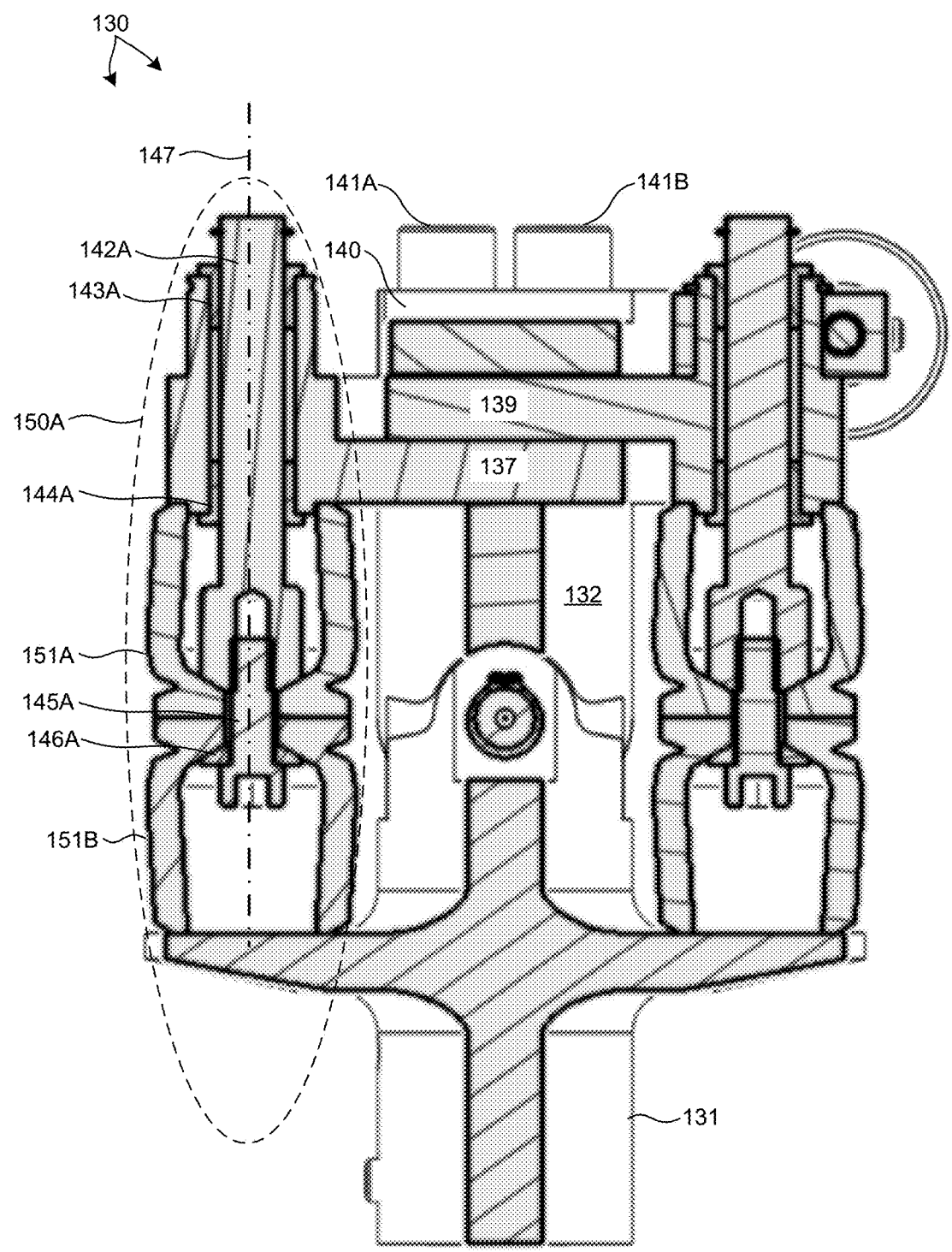
FIG. 4 is a diagram illustrative of another cross-sectional view of a one degree of freedom compliant mechanical joint device such as the compliant mechanical joint device 100 depicted in FIG. 1.

FIG. 4 is a diagram illustrative of another cross-sectional view of one degree of freedom compliant mechanical joint device 130. As depicted in FIG. 4, mechanical compliance assembly 151A includes a cylindrical pin structure 142A having longitudinal axis 147. Cylindrical pin structure 142A is mechanically fixed to polymer springs 151A and 151B by fastener 145A. Polymer springs 151A and 151B are effectively sandwiched between washer 146A and cylindrical pin 142A by fastener 145A to fixedly couple polymer springs 151A and 151B to cylindrical pin 142A. Polymer spring 151A is in contact with spring connector structure 139 and polymer spring 151B is in contact with the support plate element of integrated joint structure 131. In addition, pin structure 142A is mechanically coupled to spring connector structure 139 at bearing surfaces 143A and 144A. Bearing surfaces 143A and 144A constrain cylindrical pin 142A to move with respect to spring connector structure 139 only in a direction parallel to axis 147. Other mechanical compliance assemblies of compliant mechanical joint device 130 are similarly configured.

Figure 5:
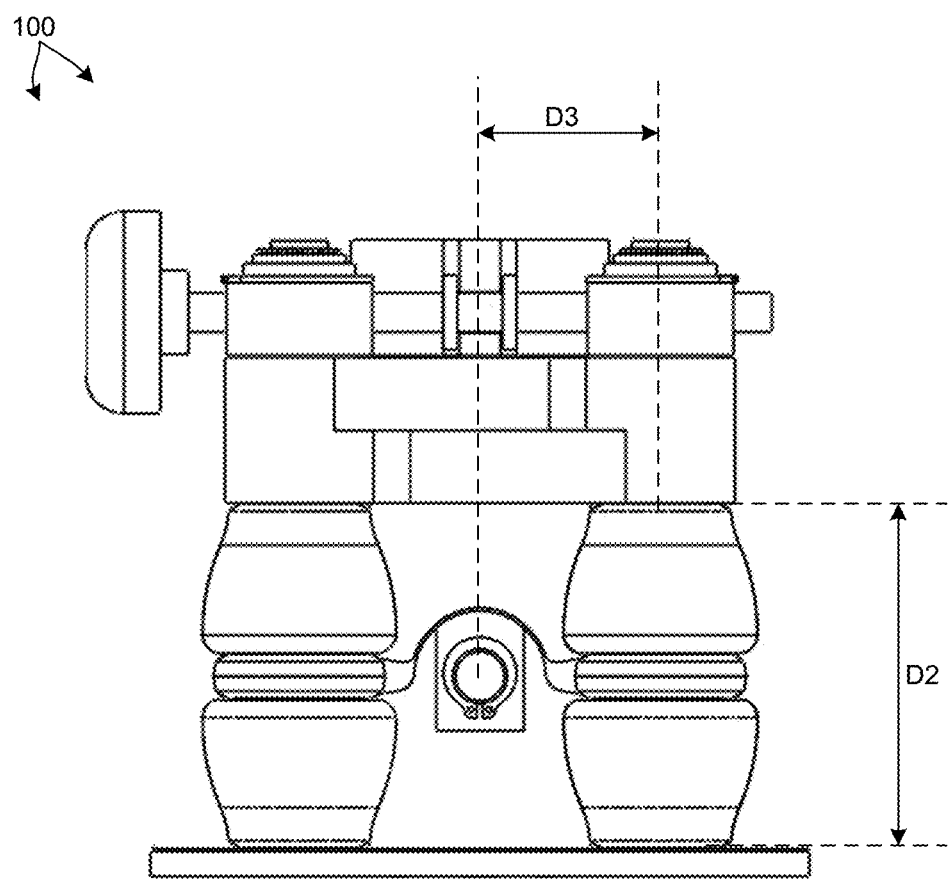
FIG. 5 is a diagram illustrative of a side view of the compliant mechanical joint device 100 depicted in FIG. 1.

FIG. 5 is a diagram illustrative of a side view of the compliant mechanical joint device 100 depicted in FIG. 1. As depicted in FIG. 5, the restoring moment induced by each mechanical compliance assembly about the compliant joint axis is the product of the restoring force of each spring and the distance (D3) from the hinge pivot to the line of action of each spring (i.e., center of each spring) in the direction perpendicular to the axis of rotation of the rotational joint. For example, the induced moment associated with a particular mechanical compliance assembly is $M=K*(D1-D2)*D3$, where K is the spring constant associated with each spring, D1 is the free length of each spring, and D2 is the compressed length of each spring. In some examples, the spring constant, K, is in a range from 100 pounds/inch-1,000 pounds/inch.

The contribution of each mechanical compliance assembly to the rotational stiffness of the rotary joint for a compliant mechanical joint device such as compliant mechanical joint device 100 depends on the square of the distance D3 and is independent of the preload (D1-D2). For example, the rotational stiffness of the rotary joint of compliant mechanical joint device 100, $K_{Rot}$ is $4*K*D3^2$ for the symmetric configuration of four polymer springs depicted in FIG. 1.

Figure 6A:
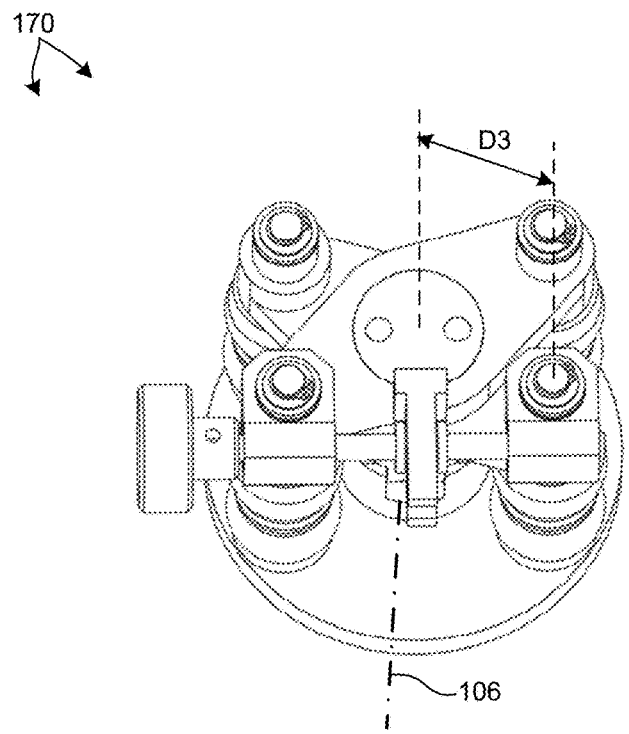
FIG. 6A is an image of a perspective view of a compliant mechanical joint device such as the compliant mechanical joint device 100 depicted in FIG. 1 configured for relatively high stiffness.

FIG. 6A depicts an image 170 of a compliant mechanical joint device such as the compliant mechanical joint device 100 configured for relatively high stiffness. As depicted in FIG. 6A, the compliant mechanical joint device is configured with a relatively large value of D3. Hence the compliant joint is configured in a relatively low compliance (very stiff) mode.

Figure 6B:
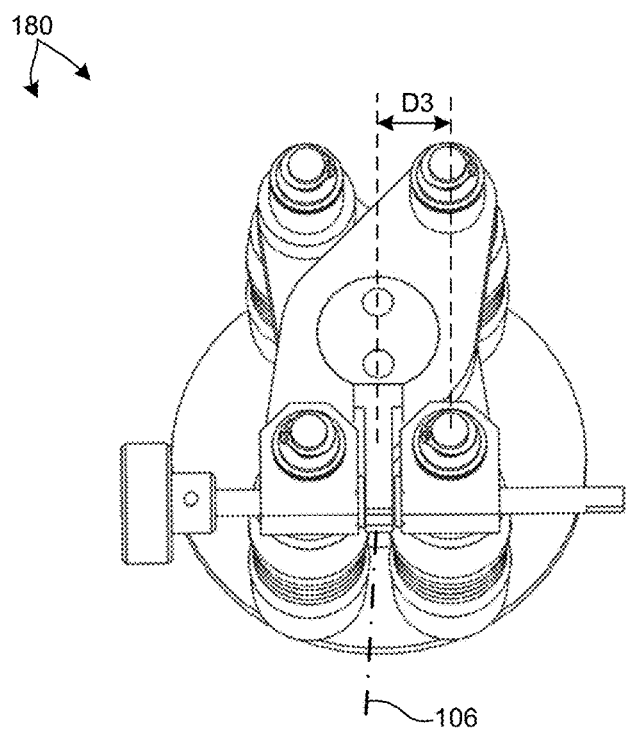
FIG. 6B is an image of a perspective view of a compliant mechanical joint device such as the compliant mechanical joint device 100 depicted in FIG. 1 configured for relatively low stiffness.

FIG. 6B depicts an image 180 of the same compliant mechanical joint device depicted in FIG. 6A, except that in FIG. 6B, the compliant mechanical joint device is configured with a relatively small value of D3. Hence, the compliant joint is configured in a relatively high compliance (very flexible) mode.

Figure 7:
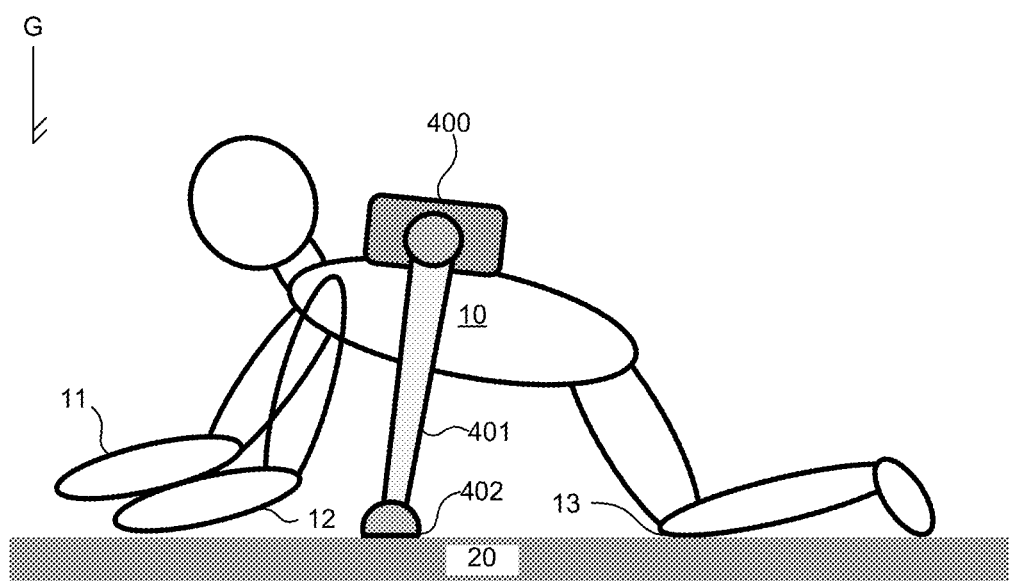
FIG. 7 is a diagram illustrative of an upper body support system 400 in one operational scenario.

FIG. 7 is a diagram illustrative of an upper body support system 400 in one operational scenario.

Upper body support system 400 passively supports the upper body of a human user working at or near the ground. In one aspect, upper body support system 400 braces the torso of a human user against a surface of the work environment. This frees the hands and arms of the human user that would otherwise be occupied supporting the human torso. Thus, a human user is able to comfortably use both hands to execute a particular work task.

The upper body support system includes one or more upper body support assemblies 401 each including an extensible body support limb that extends toward the surface of the working environment and supports the human user compliantly. In this manner the human user can move the upper body freely to change posture without losing support. In some embodiments, the nominal length of the extensible body support limb is adjustable.

In one aspect, each upper body support assembly includes an extensible body support limb coupled to a frame of the upper body support system by a compliant mechanical joint as described herein. In this manner, a compliant mechanical joint is disposed in a structural path between the harness assembly and a surface of a working environment. The compliant mechanical joint allows the extensible body support limb to rotate with respect to the frame in at least one degree of freedom in a compliant manner. In this manner the human user can move the upper body freely to change posture without losing support. As described herein, the compliance of the compliant mechanical joint is adjustable to accommodate the preferences and working conditions of the human user.

As depicted in FIG. 7, upper body support system 400 is attached to the torso 10 of a human user with a harness assembly. Two upper body support assemblies 401 are coupled to the harness assembly, one on each side of the body of the human user (i.e., in the direction perpendicular to the drawing sheet). As depicted in FIG. 7, the human user is working on the ground surface 20 oriented perpendicular to the gravity vector, G. The human user is stably supported at the ground surface at contact areas 13 associated with each knee and at contact areas 402 associated with each upper body support assembly 401. As depicted in FIG. 7, the upper body of the human user is stably supported by upper body support system 400 without the use of hands 11 and 12. In this manner both hands 11 and 12 are available to perform a task at or near the ground surface 20.

In the example depicted in FIG. 7, the upper body support system 400 is located near the center of mass of the human torso, and is configured to support most of the weight associated with the human torso. This reduces the loading on the knees, feet, and back of the human user compared to crouching or kneeling in a conventional manner. As depicted in FIG. 7, the knees of the human user are comfortably posed, for example at angles between ninety degrees and one hundred thirty five degrees. The knees do not have to be bent sharply at acute angles to stably support the human body. By distributing the weight of the human body over the passive upper body support assemblies 401, the total amount of load carried by the knees and the severity of the pose required to stably support the human body are significantly reduced.

In general, an upper body support system 400 may employ any number of passive upper body support assemblies. In addition, the upper body support system 400 may be located in any suitable location with respect to the human torso. However, it is preferable to locate the upper body support system 400 in a location that stably supports the human body weight, while minimizing the weight supported by other members of the human body, such as the knees or feet.

Figure 8:
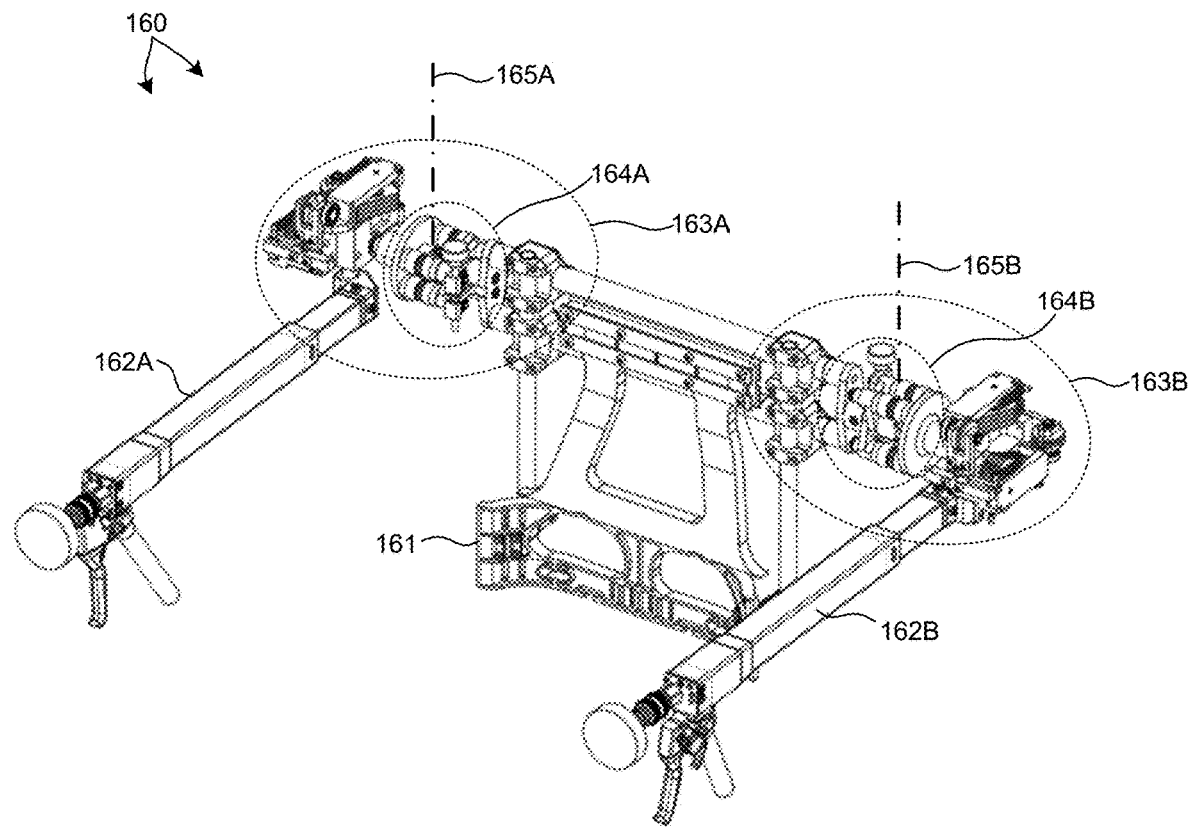
FIG. 8 is a diagram illustrative of an upper body support system 160 including one degree of freedom compliant mechanical joint devices.

FIG. 8 is a diagram illustrative of an upper body support system 160 including two upper body support assemblies each including a one degree of freedom compliant mechanical joint device. Upper body support system 160 includes a harness assembly 161 and two upper body support assemblies including shoulder joints 163A-B and extensible body support limbs 162A-B, respectively. Harness assembly 161 includes a vest (not shown) tailored to fit the human user. A human user dons the vest in a conventional manner and cinches the vest onto his/her body using locking mechanisms (e.g., buckles, cinch straps, etc.). The upper body support assemblies are each coupled to harness assembly 161. The shoulder joints 163A-B of each respective upper body support assembly includes a one degree of freedom compliant joint mechanism 164A-B. Compliant joint mechanism 164A rotates about a compliant joint axis 165A and compliant joint mechanism 164B rotates about a compliant joint axis 165B.

Figure 9:
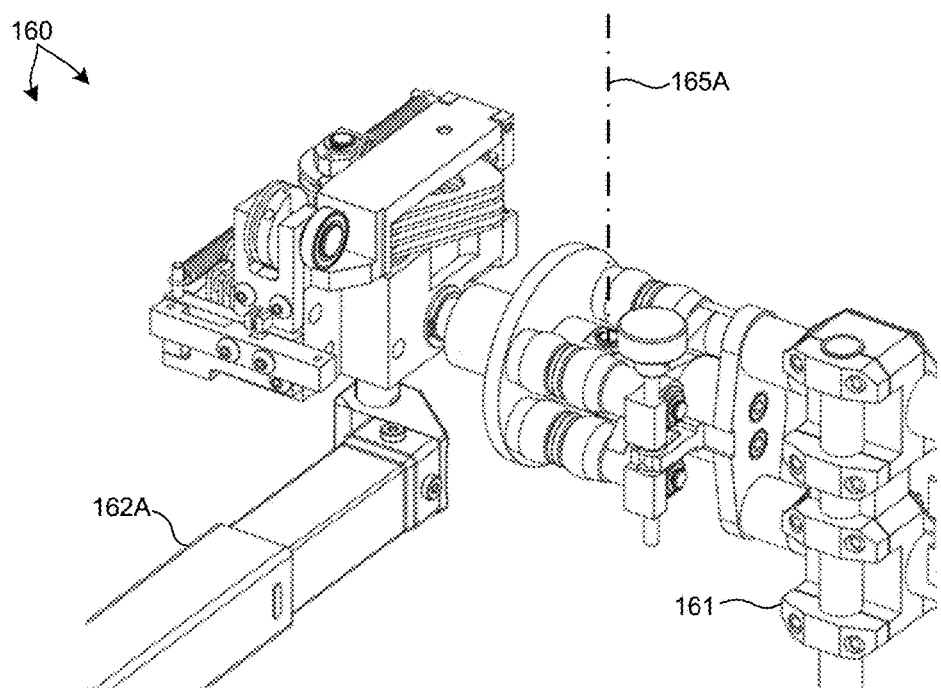
FIG. 9 is a diagram illustrative of zoomed view of upper body support system 160 depicted in FIG. 8.

FIG. 9 is a diagram illustrative of zoomed view of upper body support system 160 depicted in FIG. 8. As depicted in FIG. 9, one joint of the one degree of freedom compliant joint device is mechanically fixed to the harness assembly 161 and the other joint of the one degree of freedom compliant joint device is mechanically fixed to the extensible body support limb 162A extending toward the surface of the working environment.

Figure 10:
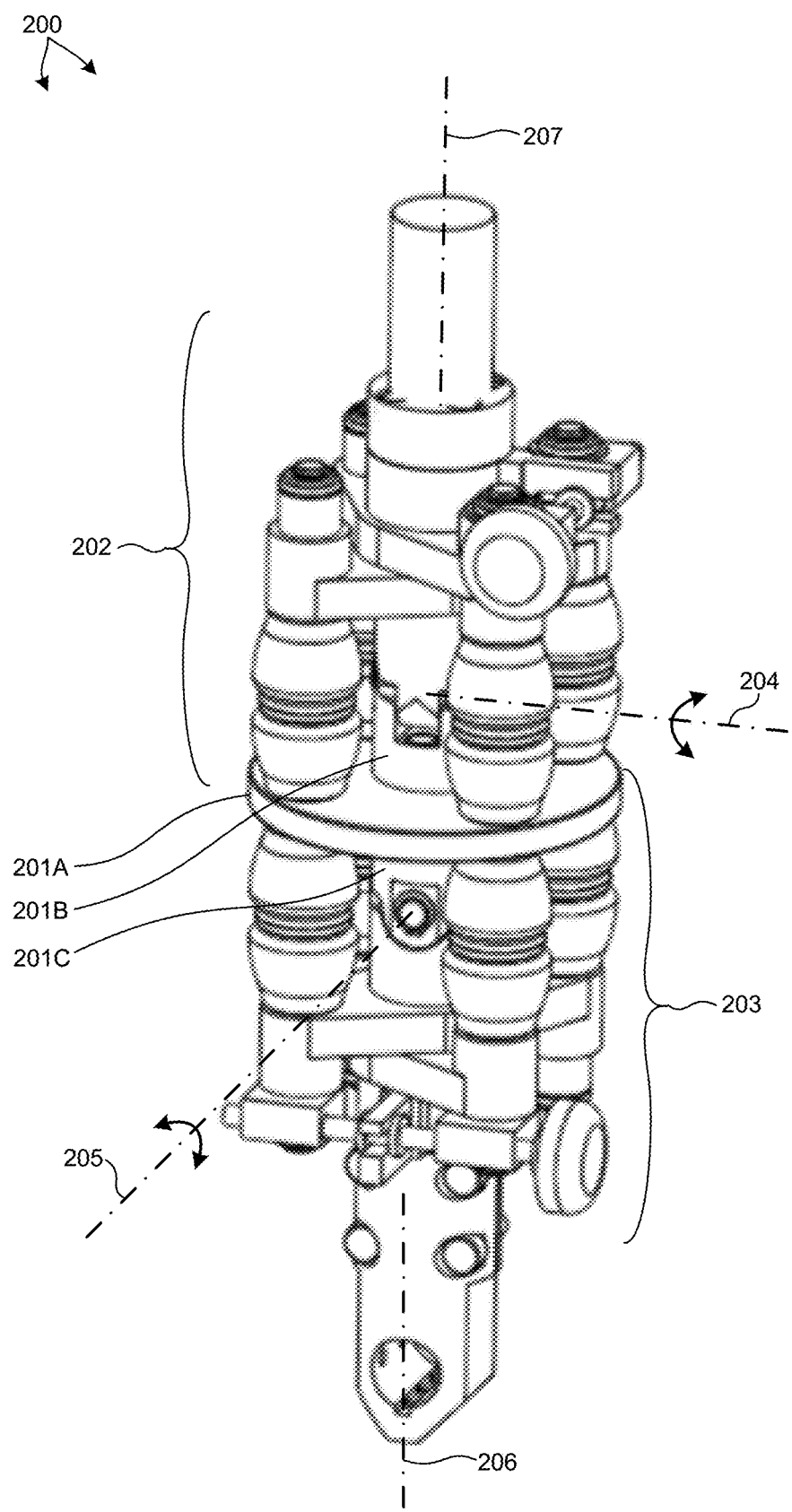
FIG. 10 is a diagram illustrative of a two degree of freedom compliant mechanical joint device 200.

FIG. 10 is a diagram illustrative of a two degree of freedom compliant mechanical joint device 200. Two degree of freedom compliant mechanical joint device 200 includes two single degree of freedom compliant mechanical joint devices, such as compliant mechanical joint device 100 depicted in FIG. 1, integrated together with a shared mechanical joint structure. As depicted in FIG. 10, two degree of freedom compliant mechanical joint device 200 includes a shared mechanical joint structure including joint 201B coupled to a single degree of freedom compliant mechanical joint 202, joint 201C coupled to another single degree of freedom compliant joint 203, and support plate 201A shared by single degree of freedom compliant joints 202 and 203. As depicted in FIG. 10, single degree of freedom compliant mechanical joint 202 includes a compliant joint axis 204 and single degree of freedom compliant mechanical joint 203 includes a compliant joint axis 205. In some embodiments, compliant joint axis 204 is orthogonal to compliant joint axis 205.

As depicted in FIG. 10, single degree of freedom compliant mechanical joints 202 and 203 are configured as described with respect to single degree of freedom compliant mechanical joint 100 depicted in FIG. 1. In general, single degree of freedom compliant mechanical joints 202 and 203 may be configured as any single degree of freedom mechanical joint described herein. In addition, single degree of freedom compliant mechanical joints 202 and 203 may be configured differently or similarly. For example, dimensions and compliances of elements of single degree of freedom compliant mechanical joints 202 and 203 may be configured differently or similarly.

Figure 11:
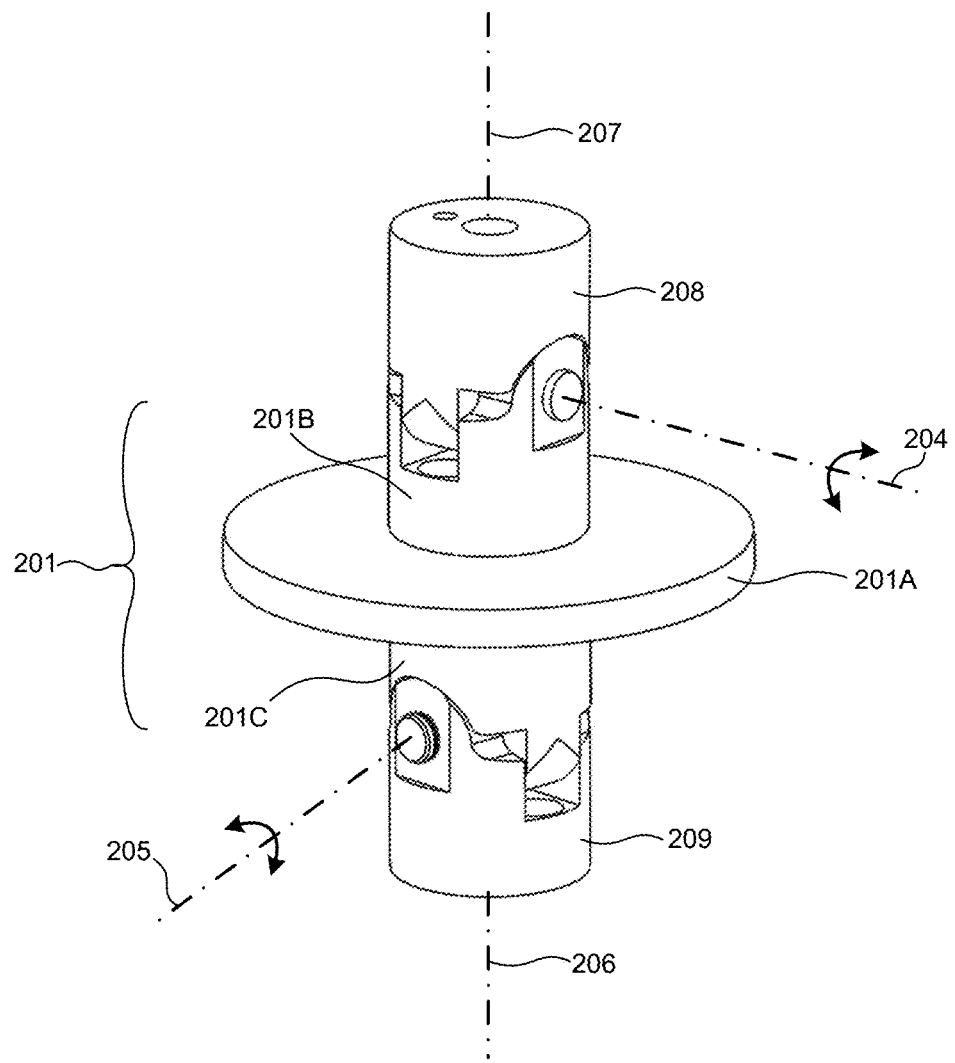
FIG. 11 is a diagram illustrative of two pin joints of two degree of freedom compliant mechanical joint device 200 depicted in FIG. 10.

FIG. 11 is a diagram illustrative of two pin joints of two degree of freedom compliant mechanical joint device 200 depicted in FIG. 10. As depicted in FIG. 11, two hinge assemblies are mounted ninety degrees apart from each other to allow the assembly to rotate in two planes. Mechanical joint structure 207 includes a longitudinal axis 207 and mechanical joint structure 209 includes a longitudinal axis 206. Mechanical joint structure 207 pivots with respect to shared mechanical joint structure 201 about compliant joint axis 204 and mechanical joint structure 206 pivots with respect to shared mechanical structure about compliant joint axis 205.

Figure 12:
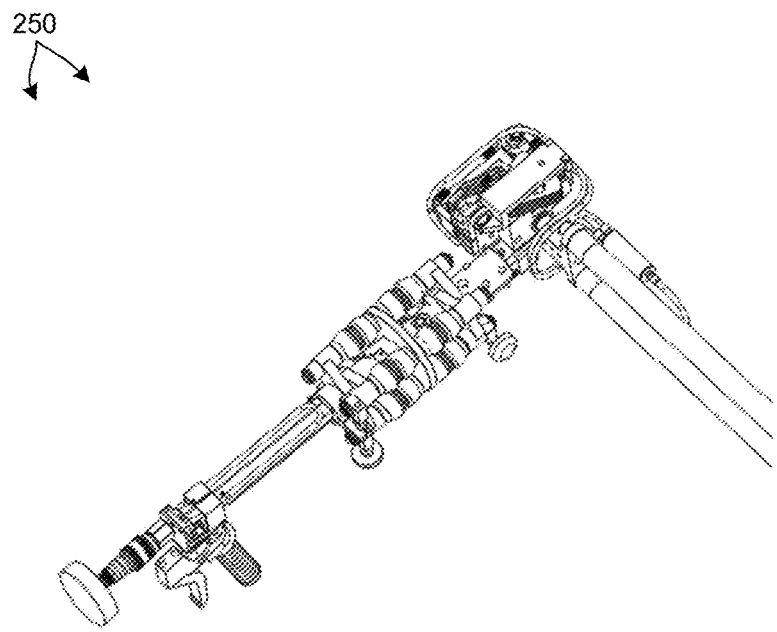
FIG. 12 is an image illustrative of an upper body support system including a two degree of freedom compliant mechanical joint device.

FIG. 12 is an image 250 illustrative of an upper body support system including a two degree of freedom compliant mechanical joint device such as two degree of freedom compliant mechanical joint device 200 depicted in FIG. 10.

Figure 13:
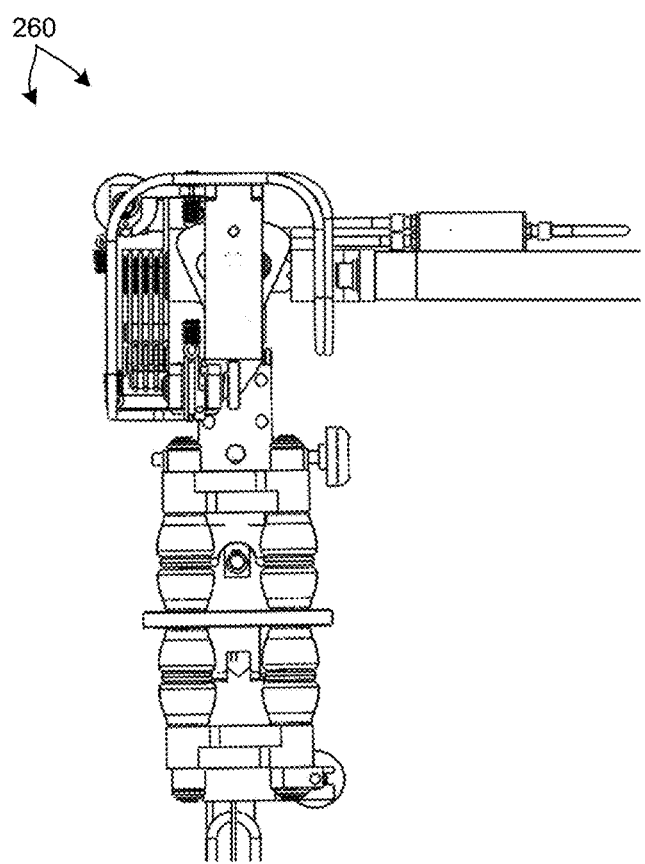
FIG. 13 is an image illustrative of an upper body support system including a two degree of freedom compliant mechanical joint device in greater detail.

FIG. 13 is an image illustrative of an upper body support system including a two degree of freedom compliant mechanical joint device such as two degree of freedom compliant mechanical joint device 200 depicted in FIG. 10 in greater detail.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A compliant mechanical joint device, comprising:
   a first mechanical joint structure having a first longitudinal axis;
   a second mechanical joint structure having a second longitudinal axis;
   a first pin structure mechanically coupled to the first mechanical joint structure and the second mechanical joint structure such that the first mechanical joint structure and the second mechanical joint structure are constrained to rotate with respect to one another about a first compliant joint axis perpendicular to the first longitudinal axis and the second longitudinal axis;
   a first spring connector structure mechanically coupled to the first mechanical joint structure such that the first spring connector structure rotates with respect to the first mechanical joint structure about the first longitudinal axis;
   a first mechanical compliance assembly mechanically coupled to the first spring connector structure at a first distance from the first longitudinal axis in a first direction, and wherein the first mechanical compliance assembly is in mechanical contact with the second mechanical joint structure, the first mechanical compliance assembly comprising one or more mechanically compliant elements; and
   a first joint stiffness adjustment mechanism coupled to the first spring connector structure, the first joint stiffness adjustment mechanism configured to rotate the first spring connector structure and the first mechanical compliance assembly about the first longitudinal axis.

2. The compliant mechanical joint device of claim 1, further comprising:
   a second spring connector structure mechanically coupled to the first mechanical joint structure such that the second spring connector structure rotates with respect to the first mechanical joint structure about the first longitudinal axis; and
   a second mechanical compliance assembly mechanically coupled to the second spring connector structure at the first distance from the first longitudinal axis in a second direction, wherein the second mechanical compliance assembly is in mechanical contact with the second mechanical joint structure, and wherein the first joint stiffness adjustment mechanism is also coupled to the second spring connector structure, the first joint stiffness adjustment mechanism further configured to rotate the first and second spring connector structures about the first longitudinal axis in opposite directions.

3. The compliant mechanical joint device of claim 2, the first joint stiffness adjustment mechanism comprising:
   a first pivot block mechanically coupled to the first spring connector structure such that the first pivot block is configured to rotate about a first axis parallel to a line of action of force generated by the first mechanical compliance assembly;
   a second pivot block mechanically coupled to the second spring connector structure such that the second pivot block is configured to rotate about a second axis parallel to a line of action of force generated by the second mechanical compliance assembly; and
   a jackscrew including a first threaded portion threaded into the first pivot block in a first direction and a second threaded portion threaded into the second pivot block in a second direction opposite the first direction, and a thrust portion in mechanical contact with the first mechanical joint structure such that the jackscrew is mechanically constrained by the first mechanical joint structure along a longitudinal axis of the jackscrew.

4. The compliant mechanical joint device of claim 2, further comprising:
   a third mechanical compliance assembly mechanically coupled to the first spring connector structure at the first distance from the first longitudinal axis in a direction opposite the first direction, wherein the third mechanical compliance assembly is in mechanical contact with the second mechanical joint structure; and
   a fourth mechanical compliance assembly mechanically coupled to the second spring connector structure at the first distance from the first longitudinal axis in a direction opposite the second direction, wherein the fourth mechanical compliance assembly is in mechanical contact with the second mechanical joint structure.

5. The compliant mechanical joint device of claim 1, wherein the one or more mechanically compliant elements is selected from a group consisting of: a polymer spring, a metallic spring, a coiled spring, a leaf spring, or any combination thereof.

6. The compliant mechanical joint device of claim 1, the first mechanical compliance assembly further comprising:
   a cylindrical pin structure having a third longitudinal axis, wherein the cylindrical pin structure is mechanically fixed to the one or more mechanically compliant elements and mechanically coupled to the first spring connector structure such that the cylindrical pin structure translates with respect to the first spring connector structure along the third longitudinal axis.

7. The compliant mechanical joint device of claim 1, the first joint stiffness adjustment mechanism comprising any of a linear actuator, an eccentric actuator, and a jackscrew.

8. The compliant mechanical joint device of claim 1, further comprising:
   a third mechanical joint structure having a third longitudinal axis;

a second pin structure mechanically coupled to the second mechanical joint structure and the third mechanical joint structure such that the second mechanical joint structure and the third mechanical joint structure are constrained to rotate with respect to one another about a second compliant joint axis perpendicular to the second longitudinal axis and the third longitudinal axis;

a second spring connector structure mechanically coupled to the third mechanical joint structure such that the second spring connector structure rotates with respect to the third mechanical joint structure about the third longitudinal axis;

a second mechanical compliance assembly mechanically coupled to the second spring connector structure at a second distance from the third longitudinal axis in a second direction, and wherein the second mechanical compliance assembly is in mechanical contact with the second mechanical joint structure; and a second joint stiffness adjustment mechanism coupled to the second spring connector structure, the second joint stiffness adjustment mechanism configured to rotate the second spring connector structure about the third longitudinal axis.

9. The compliant mechanical joint device of claim 8, wherein the first compliant joint axis and the second compliant joint axis are orthogonal.

10. The compliant mechanical joint device of claim 8, wherein the first distance and the second distance are the same distance.

11. An upper body support system comprising:
a harness assembly couplable to a torso of a human user;
a plurality of passive upper body support assemblies each coupled to the harness assembly, wherein a first of the plurality of passive upper body, support assemblies is coupled to the harness assembly on a first side of the torso of the human user, and wherein a second of the plurality of passive upper body support assemblies is coupled to the harness assembly on a second side of the torso of the human user opposite the first side, wherein each of the plurality of passive upper body support assemblies includes:
a compliant mechanical joint device, comprising:
a first mechanical joint structure having a first longitudinal axis;
a second mechanical joint structure having a second longitudinal axis;
a first pin structure mechanically coupled to the first mechanical joint structure and the second mechanical joint structure such that the first mechanical joint structure and the second mechanical joint structure are constrained to rotate with respect to one another about a first compliant joint axis perpendicular to the first longitudinal axis and the second longitudinal axis;
a first spring connector structure mechanically coupled to the first mechanical joint structure such that the first spring connector structure rotates with respect to the first mechanical joint structure about the first longitudinal axis;
a first mechanical compliance assembly mechanically coupled to the first spring connector structure at a first distance from the first longitudinal axis in a first direction, and wherein the first mechanical compliance assembly is in mechanical contact with the second mechanical joint structure; and
a first joint stiffness adjustment mechanism coupled to the first spring connector structure, the first joint stiffness adjustment mechanism configured to rotate the first spring connector structure about the first longitudinal axis, wherein the compliant joint device is disposed in a structural path between the harness assembly and a surface of a working environment.

12. The upper body support system of claim 11, wherein the first mechanical joint structure is mechanically coupled to the harness assembly, and wherein the second mechanical joint structure is mechanically coupled to a body support limb extending toward the surface of the working environment.

13. The upper body support system of claim 11, the compliant mechanical joint device, further comprising:
a third mechanical joint structure having a third longitudinal axis;
a second pin structure mechanically coupled to the second mechanical joint structure and the third mechanical joint structure such that the second mechanical joint structure and the third mechanical joint structure are constrained to rotate with respect to one another about a second compliant joint axis perpendicular to the second longitudinal axis and the third longitudinal axis;
a second spring connector structure mechanically coupled to the third mechanical joint structure such that the second spring connector structure rotates with respect to the third mechanical joint structure about the third longitudinal axis;
a second mechanical compliance assembly mechanically coupled to the second spring connector structure at a second distance from the third longitudinal axis in a second direction, and wherein the second mechanical compliance assembly is in mechanical contact with the second mechanical joint structure; and
a second joint stiffness adjustment mechanism coupled to the second spring connector structure, the second joint stiffness adjustment mechanism configured to rotate the second spring connector structure about the third longitudinal axis.

14. An apparatus comprising:
a first mechanical joint structure having a first longitudinal axis;
a second mechanical joint structure having a second longitudinal axis;
a third mechanical joint structure having a third longitudinal axis;
a first pin structure mechanically coupled to the first mechanical joint structure and the second mechanical joint structure such that the first mechanical joint structure and the second mechanical joint structure are constrained to rotate with respect to one another about a first compliant joint axis perpendicular to the first longitudinal axis and the second longitudinal axis;
a first spring connector structure mechanically coupled to the first mechanical joint structure such that the first spring connector structure rotates with respect to the first mechanical joint structure about the first longitudinal axis;
a first mechanical compliance assembly mechanically coupled to the first spring connector structure at a first distance from the first longitudinal axis in a first direction, and wherein the first mechanical compliance assembly is in mechanical contact with the second mechanical joint structure; and
a first joint stiffness adjustment mechanism coupled to the first spring connector structure, the first joint stiffness adjustment mechanism configured to rotate the first spring connector structure about the first longitudinal axis;

a second pin structure mechanically coupled to the second mechanical joint structure and the third mechanical joint structure such that the second mechanical joint structure and the third mechanical joint structure are constrained to rotate with respect to one another about a second compliant joint axis perpendicular to the second longitudinal axis and the third longitudinal axis;

a second spring connector structure mechanically coupled to the third mechanical joint structure such that the second spring connector structure rotates with respect to the third mechanical joint structure about the third longitudinal axis;

a second mechanical compliance assembly mechanically coupled to the second spring connector structure at a second distance from the third longitudinal axis in a second direction, and wherein the second mechanical compliance assembly is in mechanical contact with the second mechanical joint structure; and a second joint stiffness adjustment mechanism coupled to the second spring connector structure, the second joint stiffness adjustment mechanism configured to rotate the second spring connector structure about the third longitudinal axis.

15. The apparatus of claim 14, wherein the first compliant joint axis and the second compliant joint axis are orthogonal.

16. The apparatus of claim 14, wherein the first distance and the second distance are the same distance.

17. The apparatus of claim 14, the first mechanical compliance assembly and the second mechanical compliance assembly comprising one or more mechanically compliant elements.

18. The apparatus of claim 17, wherein the one or more mechanically compliant elements is any of a polymer spring, a metallic spring, a coiled spring, a leaf spring, or any combination thereof.

19. The apparatus of claim 14, the first joint stiffness adjustment mechanism and the second joint stiffness mechanism comprising any of a linear actuator, an eccentric actuator, and a jackscrew.

* * * * *